United States Patent
Kaji et al.

(10) Patent No.: US 10,688,787 B2
(45) Date of Patent: Jun. 23, 2020

(54) INK JET RECORDING METHOD AND INK JET RECORDING APPARATUS

(71) Applicant: CANON KABUSHIKI KAISHA, Tokyo (JP)

(72) Inventors: Mamiko Kaji, Kawasaki (JP); Satoshi Takebayashi, Tokyo (JP); Yuko Nishiwaki, Mitaka (JP); Tsuyoshi Kanke, Yokohama (JP); Takashi Imai, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/033,463

(22) Filed: Jul. 12, 2018

(65) Prior Publication Data
US 2019/0016136 A1  Jan. 17, 2019

(30) Foreign Application Priority Data

Jul. 13, 2017 (JP) .................. 2017-136748
Jun. 14, 2018 (JP) .................. 2018-113664

(51) Int. Cl.
*B41J 2/14* (2006.01)
*C09D 11/30* (2014.01)
(Continued)

(52) U.S. Cl.
CPC ....... *B41J 2/14129* (2013.01); *B41J 2/14072* (2013.01); *C09D 11/106* (2013.01);
(Continued)

(58) Field of Classification Search
CPC ...... B41J 2/05; B41J 2/14072; B41J 2/14129; B41J 25/001; B41J 25/34; B41J 25/003; B41J 25/312; B41J 2/21; B41J 2025/008; B41J 2202/21; B41J 2/18; B41J 2/175; B41J 2202/03; C09D 11/38; C09D 11/10; C09D 11/106; C09D 11/322; C09D 11/326; C09D 11/107; C09D 11/30
See application file for complete search history.

(56) References Cited

U.S. PATENT DOCUMENTS 6,406,740 B1 * 6/2002 Komuro ............... B41J 2/14129
                                                     29/610.1
7,381,257 B2   6/2008 Takayama et al.
(Continued)

FOREIGN PATENT DOCUMENTS

JP  2008-105364 A  5/2008
JP  2009-051146 A  3/2009

*Primary Examiner* — Manish S Shah
(74) *Attorney, Agent, or Firm* — Venable LLP

(57) ABSTRACT

Provided is an ink jet recording method capable of suppressing deterioration in an ejection property when voltage control of a recording head is performed. The ink jet recording method includes using an ink jet recording apparatus having a recording head equipped with a heater, a first protection layer and a second protection layer made of a metal material, and a unit of applying a voltage with the second protection layer as a cathode and an ink-mediated conduction site as an anode and ejecting the ink from the recording head to record an image on a recording medium, wherein the ink is an aqueous ink containing a component having an anionic group and a soluble metal ion having a standard electrode potential of more than 0 V.

19 Claims, 5 Drawing Sheets

(51) Int. Cl.
  *C09D 11/38*    (2014.01)
  *C09D 11/106*   (2014.01)
  *C09D 11/322*   (2014.01)
  *C09D 11/107*   (2014.01)

(52) U.S. Cl.
  CPC .......... *C09D 11/107* (2013.01); *C09D 11/30* (2013.01); *C09D 11/322* (2013.01); *C09D 11/38* (2013.01); *B41J 2202/03* (2013.01)

(56) References Cited

U.S. PATENT DOCUMENTS

| | | | |
|---|---|---|---|
| 7,950,769 B2 | 5/2011 | Sakai et al. | |
| 8,123,330 B2 | 2/2012 | Sakai et al. | |
| 8,491,087 B2 | 7/2013 | Sakai et al. | |
| 9,783,694 B2 | 10/2017 | Tominaga et al. | |
| 2007/0188572 A1* | 8/2007 | Takayama | C09D 11/322 347/100 |
| 2012/0105537 A1* | 5/2012 | Sakai | B41J 2/14072 347/22 |
| 2013/0187998 A1* | 7/2013 | Ohmoto | C09D 11/322 347/100 |
| 2014/0168314 A1* | 6/2014 | Moribe | B41J 2/2107 347/20 |
| 2014/0184702 A1* | 7/2014 | Ishida | B41J 2/14088 347/61 |
| 2015/0376413 A1* | 12/2015 | Higashi | B41J 2/2107 347/20 |
| 2017/0037267 A1 | 2/2017 | Takebayashi et al. | |

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

In recent years, an ink jet recording method has come to be able to record images having definition and color developability as high as those achieved by silver halide photography or offset printing and a demand for the reliability of an ink has become severer.

In the ink jet recording method, there are, as a method of ejecting an ink from a recording head, a method making use of mechanical energy and a method making use of thermal energy. In a thermal method that makes use of the action of thermal energy for ejecting an ink from a recording head, a heater (electrothermal conversion element) of the recording head is exposed to high temperatures. In addition, the heater is influenced by both physical action such as impact at the time of cavitation caused by foaming of an ink or shrinkage of air bubbles and chemical action of an ink. A protection layer is therefore provided at the heater portion of an ink flow path in order to protect the heater from such action. As ink ejection is repeated and a component in an ink is heated at high temperatures, there occurs a phenomenon in which the component is converted into a hardly soluble or hardly dispersible substance and the resulting substance adheres to the surface of the protection layer. This substance is so-called "kogation". The kogation which has adhered to and deposited on the protection layer hinders thermal energy given to the heater from conducting to an ink sufficiently. As a result, thermal energy to be applied to the ink decreases, which adversely affects an ejection property. Deterioration in the ejection property thus generated becomes a cause of image unevenness.

In order to overcome such a problem, measures against kogation have so far been investigated. There is a proposal on a recording head equipped with a unit for removing kogation which has adhered (Japanese Patent Application Laid-Open No. 2008-105364). In addition, Japanese Patent Application Laid-Open No. 2008-105364 discloses a method of causing an electrochemical reaction using, as an electrode, an upper protection layer formed as a surface layer portion of a protection layer and made of a metal such as iridium and thereby eluting the upper protection layer to remove kogation which has deposited on a heater portion. Further, there is a proposal on a recording head equipped with a unit for suppressing adhesion of kogation (refer to Japanese Patent Application Laid-Open No. 2009-051146). This recording head resembles to the recording head described in Japanese Patent Application Laid-Open No. 2008-105364 in using a protection layer as an electrode, but is different in the treatment of kogation. More specifically, Japanese Patent Application Laid-Open No. 2009-051146 discloses suppression of adhesion of a kogation-causative substance by carrying out voltage control for charging the protection layer to the polarity side same as that of a kogation-causing component in an ink and thereby causing electric repulsion.

SUMMARY OF THE INVENTION

As a result of investigation, the present inventors have confirmed that a certain degree of advantage can be obtained by carrying out voltage control of a recording head and suppressing adhesion of kogation with reference to the description of Japanese Patent Application Laid-Open No. 2009-051146, but have found that an increase in ink ejection frequency ink gradually deteriorates an ejection property and adversely affecting images thus obtained.

An object of the invention is therefore to provide an ink jet recording method and an ink jet recording apparatus capable of suppressing deterioration in the ejection property when voltage control of a recording head is performed.

The above-described object is achieved by the invention described below. The ink jet recording method of the invention is a method of using an ink jet recording apparatus having a recording head equipped with a heater placed in a ink flow path communicated with an ejection orifice, a first protection layer which is placed at a position corresponding to the heater and blocking a contact between the heater and an ink in the ink flow path and a second protection layer placed at a position corresponding to the heater and to be brought into contact with the ink and made of a metal material and a unit of applying a voltage with the second protection layer as a cathode and with an ink-mediated conduction site as an anode and ejecting an ink from the recording head to record an image on a recording medium. In this method, the ink is an aqueous ink containing a component having an anionic group and a soluble metal ion having a standard electrode potential of more than 0 V and at the same time, having a content (% by mass) of the metal ion of 0.1 ppm or more to 15.0 ppm or less based on the total mass of the ink.

The invention can provide an ink jet recording method and an ink jet recording apparatus capable of suppressing deterioration in the ejection property when voltage control of a recording head is performed.

Further features of the present invention will become apparent from the following description of exemplary embodiments with reference to the attached drawings.

BRIEF DESCRIPTION OF THE DRAWINGS

FIG. 1A and FIG. 1B schematically show one example of the ink jet recording apparatus to be used in the ink jet recording method of the invention, in which FIG. 1A is a perspective view of the major portion of the ink jet recording apparatus and FIG. 1B is a perspective view of a head cartridge.

DESCRIPTION OF THE EMBODIMENTS

Figure 1A:
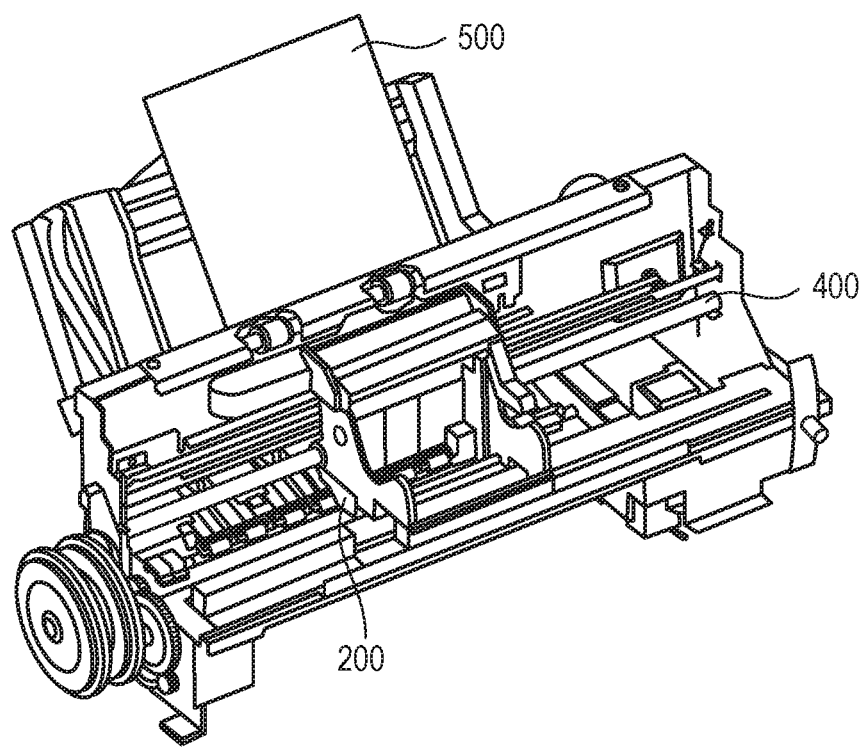

Preferred embodiments of the present invention will now be described in detail in accordance with the accompanying drawings.

The invention will hereinafter be described in further detail by a preferred embodiment. In the invention, when a compound is a salt, the salt in an ink is present while being dissociated into ions. For convenience sake, however, such a state is expressed by "the ink contains a salt". The term "ink for ink jet" may be simply called "ink". Physical property values are at normal temperature (25° C.) unless otherwise particularly specified.

In the thermal method which ejects an ink from a recording head by the action of thermal energy, the recording head has a plurality of ejection orifices, an ink flow path communicated with the ejection orifices and a heater for generating thermal energy for ejecting the ink. An electrothermal conversion element as a heater has a heat generating element and an electrode for supplying it with electricity. Since the heater is covered with a protection layer having electrical insulation properties, insulation among respective heaters corresponding to ejection orifices is secured.

Japanese Patent Application Laid-Open No. 2009-051146 discloses suppression of adhesion of a kogation-causing substance by performing voltage control so as to charge the protection layer of the heater to the polarity side same as that of the component in the ink. It has been found however that even if voltage control is performed, an increase in ejection frequency causes gradual deterioration in the ejection property. As a result of investigation of the reason for it, the present inventors have finally found that deterioration in the ejection property is triggered by a substance that has adhered to an "opposite electrode" at the time of voltage control.

The term "opposite electrode" means an electrode paired with a "heater-side electrode" and the opposite electrode is charged reversely (positively) to a component having an anionic group such as dye, resin dispersant, resin particle or the like. The component having the anionic group moves away from the negatively charged heater-side electrode, but is attracted to the opposite electrode and gradually adheres to the opposite electrode. This phenomenon has already been recognized in the invention described in Japanese Patent Application Laid-Open No. 2009-051146 and according to it, use of a polar substance having in the molecule thereof both an ionic hydrophilic group and a nonionic hydrophilic group is effective as a measure against the phenomenon. With an increase in ejection frequency, however, this polar substance gradually becomes ineffective for suppressing adhesion of the component having the anionic group to the opposite electrode.

Adhesion of a substance to the opposite electrode hinders voltage control between it and a heater-side electrode paired therewith. Then, a potential applied to the heater-side electrode decreases and an electric repulsion becomes smaller between the heater-side electrode and the component having the anionic group. In addition, there is also an influence of ejection energy. When voltage control is performed, if ejection energy is not applied to an ink in the flow path of the recording head, electric repulsion occurs between the heater-side electrode and the component having the anionic group. Then, adhesion of the component having the anionic group to the heater-side electrode is suppressed and at the same time, the dispersion state is kept stable because of the presence of a counter ion at a position stable in energy against the component having the anionic group. When energy for ejection is then applied to the ink in the flow path of the recording head, the counter ion is sometimes flicked out from the vicinity of the component having the anionic group, influenced by physical or chemical action. The dispersion state of a portion of the component having the anionic group becomes unstable and this portion then adheres to the heater as kogation. Deterioration in the ejection property is therefore presumed to occur in spite of voltage control.

Considering the above-described phenomenon, the present inventors investigated a method of more certainly suppressing adhesion of a substance to each electrode. As a result, they have found that when voltage control of a recording head is performed, deterioration in the ejection property can be suppressed by adding "a soluble metal ion having a standard electrode potential of more than 0 V" to an anionic group-containing ink. The term "soluble metal ion having a standard electrode potential of more than 0 V" may be called "soluble metal ion".

The present inventors have presumed the reason why a soluble metal ion is useful for suppressing deterioration in the ejection property as follows. The reason will hereinafter be described using, as an example of the component having the anionic group, a pigment dispersed with an anionic group-containing resin dispersant (resin-dispersed pigment). Needless to say, as well as such a resin-dispersed pigment, a component having an anionic group usable for an aqueous ink for ink jet produces an effect similar to that of the resin-dispersed pigment.

First, a phenomenon at the opposite electrode will be described. It has been confirmed that when a voltage control is performed, use of an ink containing a soluble metal ion decreases adhesion of a substance to an opposite electrode. This is presumed to occur because when a soluble metal ion is absent in an ink, no counter ion is present in the vicinity of the resin-dispersed pigment which has adhered to the opposite electrode. In other words, the anionic group is not dissociated into ions (acid type) so that hydrophilicity lowers. On the other hand, when a soluble metal ion is present in an ink, this metal ion has a standard electrode potential of more than 0 V and therefore has an ionization tendency lower than that of a hydrogen atom having a standard electrode potential of 0 V. The soluble metal ion therefore cannot continue to stay as ions and stabilizes its presence by converting the hydrogen atom constituting the acid type anionic group into a hydrogen ion. The anionic group of the resin dispersant which was once an acid type is therefore dissociated again into ions and due to electric repulsion between the resulting ions and the heater-side electrode, adhesion to the opposite electrode is prevented.

Next, a phenomenon at the heater-side electrode will be described. As described above, presence of a soluble metal ion in an ink suppresses adhesion of a resin-dispersed pigment to the opposite electrode and this enables efficient conversion of an input voltage to a potential. In addition, the soluble metal ion exhibits action of protecting the heater-side electrode. After foaming of the ink at the time of ejection, shrinkage of foams occurs and the vicinity of the heater of the recording head is supplied (refilled) with a new ink. As described above, when energy for ejection is applied to an ink in the recording head, counter ions are sometimes flicked out from the vicinity of the resin-dispersed pigment, influenced by the physical or chemical action. As a result, the dispersion state of a portion of the resin-dispersed pigment becomes unstable. Then, it becomes kogation and adheres to the heater. Here, the soluble metal ion has a charge opposite to that of the heater-side electrode and at the same time, even compared with a main component having an anionic group such as a coloring material or resin in the ink, it has a sufficiently small molecular weight and has a compact molecular size. Due to such properties, the soluble metal ion in the ink moves to the vicinity of the heater-side electrode at the time of refilling and shows action as if protecting the heater-side electrode. It is therefore presumed that irrespective of the presence of the resin-dispersed pigment that has lost its stable dispersion state, adhesion of it to the heater-side electrode can be suppressed.

The soluble metal ion having a standard electrode potential less than 0 V has an ionization tendency higher than that of a hydrogen atom and therefore does not cause the above-described action so that it cannot suppress deterioration in the ejection property. Even if the soluble metal ion having a standard electrode potential of more than 0 V is present in the ink, the component having the anionic group which has adhered to the opposite electrode cannot be removed completely if its amount is too small and therefore, deterioration in the ejection property cannot be suppressed. When the amount is too large, on the other hand, it adheres even to the heater-side electrode and decreases the electric repulsion. The deterioration in the ejection property cannot therefore be suppressed. The content (ppm) of the above-described metal ion in the ink is required to be 0.1 ppm or more to 15.0 ppm or less based on the total mass of the ink.

<Ink Jet Recording Method, Ink Jet Recording Apparatus>

The ink jet recording method of the invention is a method of recording an image on a recording medium by ejecting an aqueous ink from an ink jet system recording head. It makes use of, as an ink ejection method, a method of applying thermal energy to an ink.

Figure 1B:
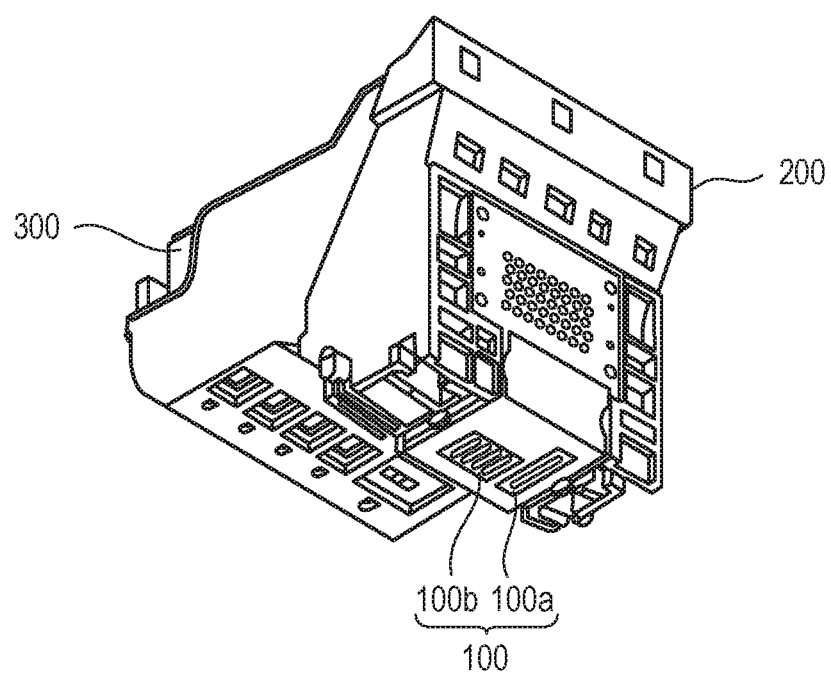

FIG. 1A and FIG. 1B each schematically show one example of the ink jet recording apparatus used in the ink jet recording method of the invention. FIG. 1A is a perspective view of the major portion of the ink jet recording apparatus and FIG. 1B is a perspective view of a head cartridge. The ink jet recording apparatus is equipped with a conveyance unit (not shown) for conveying a recording medium 500 and a carriage shaft 400. On the carriage shaft 400, a head cartridge 200 can be mounted. The head cartridge 200 is equipped with a recording head 100 (100a and 100b) and is constituted to permit an ink cartridge 300 to be set thereon. During conveyance of the head cartridge 200 in a main scanning direction along the carriage shaft 400, an ink (not shown) is ejected from the recording head 100 (100a and 100b) to the recording medium 500. The recording medium 500 is then conveyed in a sub-scanning direction by means of the conveyance unit (not shown) and thus, an image is recorded on the recording medium 500.

(Recording Head)
(Recording Element Substrate)

Figure 2:
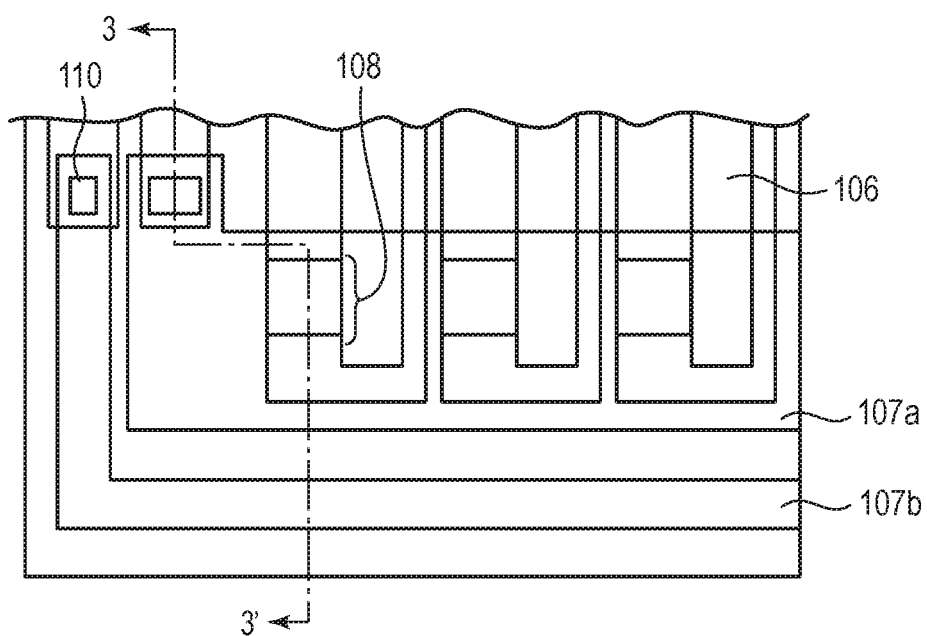
FIG. 2 is a plan view schematically showing the vicinity of a heater of a recording element substrate.
Figure 3:
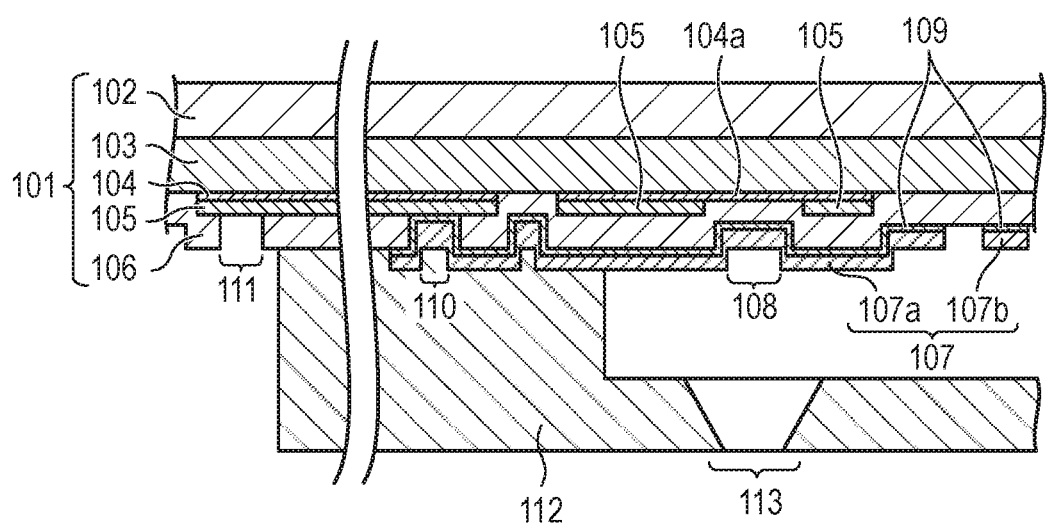
FIG. 3 is a cross-sectional view schematically showing the recording element substrate cut vertically along the line 3-3' of FIG. 2.

FIG. 2 is a plan view schematically showing the vicinity of a heater of a recording element substrate. FIG. 3 is a cross-sectional view schematically showing the recording element substrate cut vertically along the line 3-3' of FIG. 2.

The constitution of a recording element substrate 101 of the recording head 100 will be described. The recording element substrate 101 is composed of a silicon substrate body 102, a heat storage layer 103, a heat generating resistor layer 104 and an electric wiring layer 105. The heat storage layer 103 is made of a material such as a thermal oxide film of silicon, a silicon oxide film, a silicon nitride film or the like. The electric wiring layer 105 is a wiring made of a metal material such as aluminum, aluminum-silicon, aluminum-copper or the like. A heat generating portion 104a as a heater (electrothermal conversion element) is formed by removing a portion of the electric wiring layer 105 to form a gap and exposing the heat generating resistor layer 104 from the gap. The electric wiring layer 105 is connected to a drive element circuit (not shown) or external power terminal (not shown) and supplied with electricity from the outside. In the example shown in the drawing, the electric wiring layer 105 is placed as a layer adjacent to the heat generating resistor layer 104. The constitution of the recording element substrate is not limited to the above-described one but it may have a constitution obtained by forming the electric wiring layer 105 as a layer adjacent to the silicon substrate body 102 or the heat storage layer 103, removing a portion of the layer as a gap and placing the heat generating resistor layer 104 thereon.

A first protection layer 106 is made of a material such as silicon oxide or silicon nitride and is provided adjacent to the heat generating portion 104a and the heat generating resistor layer 104 while partially having the electric wiring layer 105 therebetween. The first protection layer 106 functions as an insulating layer for blocking the contact between the heat generating portion 104a and the ink in the ink flow path.

A second protection layer 107 is an outermost layer to be brought into contact with the ink in the ink flow path. A region of the second protection layer 107 located on the side of the ink flow path of the heat generating portion 104a and at the same time, causes the heat generated at the heat generating portion 104a to act on the ink corresponds to a heater 108. The second protection layer 107 has a function of protecting the heater 108 from chemical impact or physical impact (cavitation) caused by the heat generation at the heat generating portion 104a and also has a function as an electrode. The second protection layer 107 made of a metal material is used in order to satisfy both of these functions.

The protection layer is preferably resistant to physical action such as impact by cavitation or chemical action from the ink. As a material constituting the protection layer, therefore, at least one metal material selected from the group consisting of iridium, ruthenium, tantalum and a material containing at least any of these metal elements is preferably used. It is more preferred to use at least one metal material selected from the group consisting of iridium, ruthenium and a material containing at least either of iridium and ruthenium. Examples of the material containing at least either or any of the above-described metal elements include alloys of these metal elements with another metal. A protection layer made of an alloy tends to be more resistant to physical action or chemical action when having a larger content of the above-described metal element. Preferably, not an alloy but iridium, ruthenium or tantalum is used. Iridium or ruthenium is particularly preferred because it hardly forms a strong oxide film even by heating and enables more uniform generation of a potential so that the component having the anionic group which has adhered to the electrode can easily be removed. Further, iridium is more preferably used because although the surface of the second protection layer is heated to from about 300° C. to 600° C. by heating with the heater 108, iridium does not form an oxide film up to 800° C. even in the atmosphere, that is, an oxygen-richer condition than in the ink.

As the second protection layer 107, at least one metal material selected from the group consisting of iridium, ruthenium, tantalum and a material containing at least any of these metal elements can be used, but these metal materials has poor adhesion properties. An adhesion layer 109 is therefore placed between the first protection layer 106 and the second protection layer 107 to improve the adhesion of the second protection layer 107 to the first protection layer 106. The adhesion layer 109 is made of an electroconductive material.

The second protection layer 107 is inserted through a through-hole 110 and is electrically connected to the electric wiring layer 105 via the adhesion layer 109. The electric wiring layer 105 extends to the end portion of the recording element substrate 101 and the tip of it becomes an external electrode 111 for electrical connection to the outside.

The recording element substrate 101 having the above-described constitution is joined with a flow path forming member 112. The flow path forming member 112 has an ejection orifice 113 at a position corresponding to the heater 108 and at the same time, it forms an ink flow path starting from an ink supply port (not shown) provided so as to penetrate the recording element substrate 101, passing the heater 108 and communicated with the ejection orifice 113.

[Voltage Control]

A method of performing the above-described voltage control at the recording head will next be described. The second protection layer 107 is composed of two regions, that is, a region (heater-side region) 107a including the heater 108 formed at a position corresponding to the heat generating portion 104a and the other region (opposite electrode-side region) 107b. Electrical connection is provided to each of these regions. When the ink flow path has no ink therein, no electrical connection exists between the heater-side region 107a and the opposite electrode-side region 107b. The ink to be used in the invention however has therein electrolytes including component having the anionic group and soluble metal ion. When the ink flow path is filled with the ink, therefore, the heater-side region 107a and the opposite electrode-side region 107b as an ink-mediated conduction site have electrically conducted with each other via the ink.

Under such a state, a voltage is applied with the heater-side region 107a as a cathode and the opposite electrode-side region 107b as an anode, a potential difference appears between these electrodes. The component having the anionic group and the soluble metal ion generate electric repulsion to the heater-side region 107a and the opposite electrode-side region 107b, respectively and the distribution state of each of the components changes depending on the charged state of each of the electrodes. The heater-side region 107a is negatively charged so that due to electric repulsion, the component having the anionic group is separated from the vicinity of the heater 108 and is prevented from adhering to the heater. Thus, deterioration in the ejection property is suppressed. The opposite electrode-side region 107b is positively charged so that the component having the anionic group moves and approaches this region and a portion of the component adheres temporarily to the opposite electrode-side region 107b. By the soluble metal ion present in the vicinity thereof, the component having the anionic group can however be removed. Thus, the respective behaviors of the heater-side region 107a and the opposite electrode-side region 107b are combined with each other and can suppress deterioration in the ejection property when the voltage control of the recording head is performed.

[Constitution of Control System]

Figure 4:
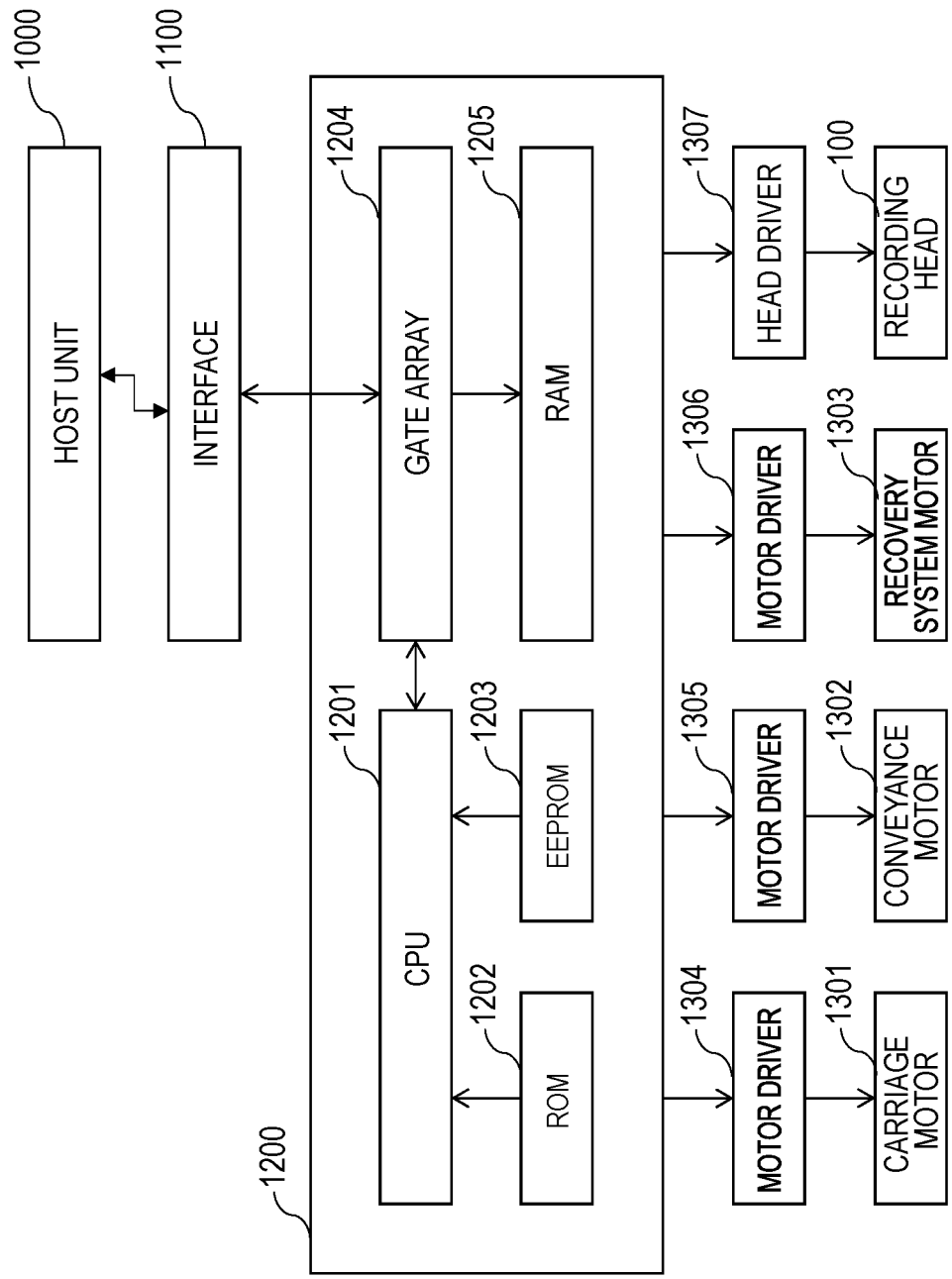
FIG. 4 is a block diagram showing one example of control constitution of the ink jet recording apparatus.

FIG. 4 is a block diagram showing one example of the control constitution of the ink jet recording apparatus shown in FIG. 1A and FIG. 1B. A controller 1200 is a main control unit, executes the procedures shown in FIG. 5, and has CPU 1201, ROM 1202, EEPROM 1203 and RAM 1205. The CPU 1201 takes a form of a microcomputer or the like and controls each unit of the recording apparatus in accordance with a control program or predetermined data stored in the ROM 1202 and corresponding to the procedures described later referring to FIG. 5. The data include, for example, drive conditions of the recording head such as shape or drive time of a drive pulse to be applied to the heat generating portion 104a, a voltage to be applied to the second protection layer 107 and duration of voltage application. The EEPROM 1203 retains a predetermined data when the power of the apparatus is OFF. The RAM 1205 is provided with a region for expanding image data or a region for working area. A gate array 1204 controls the supply of recording data to the recording head 100 and at the same time, controls data transfer among an interface 1100, CPU 1201 and RAM 1205. A host unit 1000 is a supply source of image data. It may be a computer engaged in formation or treatment of image data relating to recording or a reader unit for reading images. Image data, other commands and status signals are sent or received between the host unit and the controller 1200 via the interface 1100.

A carriage motor 1301 conveys a carriage having thereon the head cartridge 200 equipped with the recording head 100 in a main scanning direction and it is driven by a motor driver 1304. A conveyance motor 1302 conveys the recording medium 500 and it is driven by a motor driver 1305. A recovery system motor 1303 operates a cap that covers the ejection orifice of the recording head 100 or a suction recovery unit such as a suction recovery pump and it is driven by a motor driver 1306. A head driver 1307 drives the recording head 100.

[Procedures of Voltage Control]

Figure 5:
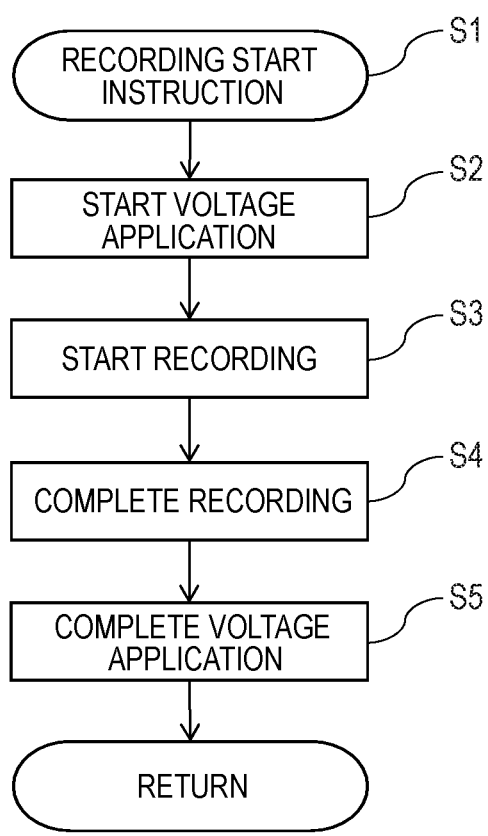
FIG. 5 is a schematic view showing one example of procedures of voltage control.

The procedures of voltage control will next be described. FIG. 5 is a schematic view showing one example of the procedures of the voltage control. With a recording instruction given from the host unit 1000 or the like, the following procedures are started. First, image data relating to recording is received from the host unit 1000 and the image data is expanded as data adapted to the recording apparatus (Step S1). Next, a potential difference is caused between the heater-side region 107a and the opposite electrode-side region 107b of the second protection layer 107 in the recording head 100 (Step S2). At this time, from a voltage application unit of the recording apparatus via the recording element substrate 101 of the recording head 100, voltage application is started with the heater-side region 107a of the second protection layer 107 as a cathode and the opposite electrode-side region 107b as an anode. Then, an ink is ejected and recording is started (Step S3). After completion of the recording (Step S4), voltage application between the heater-side region 107a and the opposite electrode-side region 107b of the second protection layer 107 is stopped and a potential difference between them is released (Step S5). The recording operation by ink ejection in the present embodiment includes not only a period during recording by the ejection of an ink from the recording head but also a period from receiving of a recording start instruction to completion of the ink ejection.

This voltage control is performed to suppress adhesion of a kogation-causing substance to the heater. It is therefore preferred to continuously carry out voltage control, based on the recording data or preliminary ejection data, during from a predetermined time before ink ejecting operation timing to a predetermined time thereafter. The period where voltage control is continued may be set as needed in consideration of power consumption or the like. Based on that voltage control is performed in the presence of an aqueous ink containing an electrolyte, a voltage to be applied is from about 0.1 V to 4 V at which no water electrolysis occurs, more preferably from about 1 V to 4 V.

Voltage application with the heater-side region 107a of the second protection layer 107 as a cathode and the opposite electrode-side region 107b as an anode may be performed so that these electrodes have a relationship between a cathode and an anode as described above. The control at this time can be achieved by the following methods: (1) application of a positive potential to the opposite electrode-side region 107b with the heater-side region 107a as a ground, (2) application of a negative potential to the heater-side region 107a with the opposite electrode-side region 107b as a ground and (3) application of a potential to both the heater-side region 107a and the opposite electrode-side region 107b. Of these, the method (1) is preferred in the invention.

<Aqueous Ink>

The ink used in the ink jet recording method and ink jet recording apparatus in the invention is an aqueous ink for ink jet containing a component having an anionic group and a soluble metal ion having a standard electrode potential of more than 0 V. Further, the content (ppm) of the soluble metal ion having a standard electrode potential of more than 0 V in the ink is required to be 0.1 ppm or more to 15.0 ppm or less based on the total mass of the ink. Components constituting the ink and physical properties of the ink will hereinafter be described.

(Component Having an Anionic Group)

No particular limitation is imposed on the component having the anionic group insofar as it is embraced in the following definition. Specific examples include anionic group-containing a coloring material having an anionic group such as a dye and a self-dispersible pigment, resins having an anionic group such as a water-soluble resin and a resin particle and an additive such as a surfactant and a pH regulator. At least any of these components are usually present in an ink if the ink is an aqueous ink for inkjet. Of these, the coloring material having the anionic group such as a self-dispersible pigment and the resin having the anionic group are more preferred, with the resin having the anionic group being particularly preferred. These components are solid components so that they tend to adhere to a heater as kogation, but by even if these components are used, excellent ejection property can be achieved by employing the constitution of the invention.

The content (% by mass) of the component having the anionic group in the ink differs depending on the number of the anionic groups of the component or intended use, but is preferably 20.00% by mass or less based on the total mass of the ink. The content is more than 20.0% by mass, it may fail to sufficiently suppress the deterioration in the ejection property because an increase in the content of the component having the anionic group in the ink increases the adhesion frequency to the opposite electrode. The content (% by mass) of the component having the anionic group in the ink is preferably 0.10% by mass or more based on the total mass of the ink. The above-described content means a total content when a plurality of components having the anionic group is used.

(Coloring Material)

As the coloring material, pigments or dyes can be used. The content of the coloring material in the ink is preferably 0.50% by mass or more to 15.00% by mass or less, more preferably 1.00% by mass or more to 10.00% by mass or less, each based on the total mass of the ink.

Specific examples of the pigments include inorganic pigments such as carbon black and titanium oxide and organic pigments such as azo, phthalocyanine, quinacridone, isoindolinone, imidazolone, diketopyrrolopyrrole and dioxazine.

As the pigment, when classified by a dispersing method, a resin-dispersed pigment using a resin as a dispersant or a self-dispersible pigment having a hydrophilic group-bonded particle surface can be used. As well, a resin bonded pigment obtained by chemically bonding a resin-containing organic group to the particle surface of the pigment or a microcapsule pigment having a particle surface coated with a resin or the like can be used. As the "component having anionic group", resin-dispersed pigments making use of an anionic group-containing resin as a dispersant or self-dispersible pigments having an anionic group as the hydrophilic group can be used.

As the resin dispersant, the resin having the anionic group which is capable of dispersing a pigment in an aqueous medium by the action of the anionic group are preferred. As the resin dispersant, resins described later are preferred, with water-soluble resins being more preferred. A ratio of the content (% by mass) of the pigment to the content of the resin dispersant (pigment/resin dispersant) is preferably 0.3 or more to 10.0 or less.

As the self-dispersible pigment, usable are those having an anionic group such as carboxylic acid group, sulfonic acid group or phosphonic acid group bonded to the surface of a pigment particle directly or through another atomic group (—R—). The anionic group may be present in either of an acid or salt form. In the latter case, either a portion or the whole of the salt may be dissociated. Examples of a cation which is the counter ion of the anionic group in salt form include alkali metal cations, ammonium and organic ammoniums. Specific examples of the another atomic group (—R—) include linear or branched alkylene groups having 1 to 12 carbon atoms, arylene groups such as phenylene and naphthylene, carbonyl groups, imino groups, amide groups, sulfonyl groups, ester groups and ether groups. As the another atomic group, these groups may be used in combination.

As the dye, an anionic group-containing dye is preferred. Specific examples of the dye include azo, triphenylmethane, (aza)phthalocyanine, xanthene and anthrapyridone dyes.

Of the coloring materials, compounds having a copper phthalocyanine skeleton are preferred. Examples of the compound having a copper phthalocyanine skeleton include pigments such as C.I. Pigment Blue 15:3 and C.I. Pigment Blue 15:4 and dyes such as C.I. Direct Blue 199.

(Resin)

The ink may contain a resin. The content (% by mass) of the resin in the ink is preferably 0.10% by mass or more to 20.00% by mass or less, more preferably 0.50% by mass or more to 15.00% by mass or less, each based on the total mass of the ink.

The resin can be incorporated in the ink for the purpose of (i) stabilizing the dispersion state of the pigment, that is, serving as the above-described resin dispersant or an auxiliary agent thereof, (ii) improving various properties of an image to be recorded, and the like. As the resin to be incorporated in the ink because of the above-described reason (i) or (ii), a resin having an anionic group, that is, the above-described "component having anionic group" can be used. Examples of the form of the resin include block copolymers, random copolymers and graft copolymers, and combinations thereof. The resin may be dissolved as a water-soluble resin in an aqueous medium or dispersed as a resin particle in an aqueous medium. The resin particle does not necessarily enclose the coloring material therein.

In the invention, when the resin is water-soluble, it means that by neutralization of the resin with an alkali equimolar to the acid value of the resin, the resin does not form a particle having a particle size measurable by dynamic light scattering. Whether the resin is water-soluble or not can be determined by the following method. First, a liquid containing a resin (resin solid content: 10% by mass) neutralized with an alkali (sodium hydroxide, potassium hydroxide, or the like) equivalent to its acid value is prepared. Then, the liquid thus prepared is diluted to 10 times (based on volume) with pure water to prepare a sample solution. The particle size of the resin in the sample solution is measured by dynamic light scattering. If a particle with a particle size are not measured, the resin can be determined as water-soluble. The measurement conditions at this time can be set, for example, as follows: SetZero: 30 seconds, measurement times: 3, and measurement time: 180 seconds. As a particle size distribution analyzers, a dynamic light scattering particle size analyzer (for example, "UPA-EX150"; product of NIKKISO) can be used. It is needless to say that the particle size distribution analyzer and measurement conditions are not always limited to the above-described ones.

The resin, when it is a water-soluble resin, has preferably an acid value of 250 mgKOH/g or less, more preferably 100 mgKOH/g or more to 250 mgKOH/g or less while the resin in the form of a resin particle has preferably an acid value of 5 mgKOH/g or more to 100 mgKOH/g or less. In the case of the resin particle, an introduction amount of an acid group is preferably 250 µmol/g or less, more preferably 120 µmol/g or more to 250 µmol/g or less. Since the introduction amount of an acid group into the resin particle is generally small, an "introduction amount (µmol/g) of an acid group" is preferably used instead of an acid value (mgKOH/g) in order to grasp the properties of the resin particle more precisely. The acid value of the water-soluble resin is more than 250 mgKOH/g or the introduction amount of an acid group into the resin particle is more than 250 µmol/g, it may not suppress the deterioration in the ejection property sufficiently. This is because when the resin adheres to the opposite electrode, a too large amount of the anionic group of the resin hinders efficient exhibition of ion dissociating action of the soluble metal ion.

The weight average molecular weight of the resin, when it is a water-soluble resin, is preferably 3,000 or more to 15,000 or less, while that of the resin particle is preferably 1,000 or more to 2,000,000 or less. The volume-based particle size of the resin particle as measured by dynamic light scattering (under measurement conditions similar to those described above) is preferably 50 nm or more to 500 nm or less.

Examples of the resin include acrylic resins, urethane resins and olefin-based resins. Of these, acrylic resins and urethane resins are preferred.

As acrylic resins, those having a hydrophilic unit and a hydrophobic unit as a constitution unit are preferred. Of these, resins having a hydrophilic unit derived from (meth) acrylic acid and a hydrophobic unit derived from at least one of an aromatic ring-containing monomer and a (meth) acrylate-based monomer are preferred. Particularly preferred are resins having a hydrophilic unit derived from (meth)acrylic acid and a hydrophobic unit derived from at least one of styrene and α-methylstyrene monomers. These resins easily cause interaction with the pigment so that they can preferably be used as a resin dispersant for dispersing the pigment.

The hydrophilic unit is a unit having a hydrophilic group such as anionic group. The hydrophilic unit can be formed, for example, by polymerizing a hydrophilic monomer having a hydrophilic group. Specific examples of the hydrophilic monomer having a hydrophilic group include acidic monomers having a carboxylic acid group such as (meth) acrylic acid, itaconic acid, maleic acid or fumaric acid and anionic monomers such as anhydrides or salts of these acidic monomers. Examples of a cation constituting the salt of the acidic monomer include ions such as lithium, sodium, potassium, ammonium, and organic ammonium. The hydrophobic unit is a unit not having a hydrophilic group such as anionic group. The hydrophobic unit can be obtained by polymerizing a hydrophobic monomer not having a hydrophilic group such as anionic group. Specific examples of the hydrophobic monomer include aromatic ring-containing monomers such as styrene, α-methylstyrene and benzyl (meth)acrylate and (meth)acrylate-based monomers such as methyl (meth)acrylate, butyl (meth)acrylate and 2-ethylhexyl (meth)acrylate.

As the urethane resin, for example, that obtained by reacting a polyisocyanate with a polyol can be used. It may be obtained by reacting, in addition to them, with a chain extending agent. Examples of the polyolefin-based resin include polyethylene and polypropylene.

(Soluble Metal Ion Having a Standard Electrode Potential of More than 0 V)

In the ink, a soluble metal ion having a standard electrode potential of more than 0 V is incorporated. The term "standard electrode potential" means a single-electrode potential of a metal or the like and it is a value expressed by the unit of V (volt) with the potential of a standard hydrogen electrode as reference (0 volt). It is a quantified value of a so-called "ionization tendency". The standard electrode potential of a metal is defined as a value of a metal itself in principle and it is described, for example, in "Kagaku Binran Kisohen II, revised fifth edition, edited by The Chemical Society of Japan, published by MARUZEN Co., Ltd.)

Examples of a metal having a standard electrode potential of more than 0 V at 25° C. include gold, platinum, iridium, silver, mercury, copper and ruthenium. Metals having a standard electrode potential less than 0 V (for example, lead, tin, nickel, cobalt, iron, zinc and aluminum) cannot suppress deterioration in the ejection property because even if the ink contains the soluble metal ion of such a metal, no action occurs for suppressing adhesion to the opposite electrode. Among the metals having a standard electrode potential of more than 0 V, metals different from the main component (iridium, ruthenium or the like) constituting the second protection layer of the recording head are preferred, with copper and silver being particularly preferred. The soluble metal ion of such a metal, compared with that of the other metal, easily exists stably in the aqueous ink so that deterioration in the ejection property can be suppressed more effectively.

Metals having a standard electrode potential of more than 0 V are required to be present in an ink as a soluble ion. The term "soluble" means that the metal can be present in dissolved form in the ink. Whether a metal ion, in the ink, having a standard electrode potential of more than 0 V is "soluble" or not can be determined, for example, by the following method. An excess of an acid is added to an ink to precipitate the component thereof, followed by separation between the precipitate and a supernatant liquid by centrifugation or the like. The supernatant liquid can be analyzed by inductively coupled plasma atomic emission spectroscopy or the like to find the presence of a metal and its kind or content. The mass of the metal and the mass of its ion are substantially equal so that as a metal ion content, a value calculated as a content of the "metal" is used for convenience sake.

An ink containing a particulate substance such as pigment or a resin particle may be analyzed by omitting addition of an excess of an acid and using a supernatant liquid obtained by centrifugation. Anyway, if the metal ion is "soluble", it is present in a liquid component even after acid addition or centrifugation so that whether the "metal ion" is "soluble" or not can be determined by such analysis. The above-described determination may also be performed by using an intermediate material used for preparation of an ink such as pigment dispersion liquid, aqueous dye solution or resin-containing liquid.

The content (ppm) of the soluble metal ion having a standard electrode potential of more than 0 V in the ink is required to be 0.1 ppm or more to 15.0 ppm or less based on the total mass of the ink. The content less than 0.1 ppm or more than 15.0 ppm cannot suppress deterioration in the ejection property as described above. A metal having a standard electrode potential of more than 0 V usually becomes a multivalent metal ion so that existence with the component having the anionic group in the ink causes an ion reaction and may deteriorate the storage stability of the ink. The content of it is therefore preferably not too large. More specifically, the content (ppm) of the soluble metal ion having a standard electrode potential of more than 0 V in the ink is preferably 0.1 ppm or more to 10.0 ppm or less based on the total mass of the ink.

It is particularly preferred that the soluble metal ion having a standard electrode potential of more than 0 V in the ink is copper or silver and its content (ppm) is 1.0 ppm or more to 10.0 ppm or less based on the total mass of the ink. The soluble metal ion satisfying these conditions can more effectively suppress deterioration in the ejection property. When copper and silver are used in combination, the above content means a total content of them.

Examples of the soluble metal ion include free metal ions and complex ions. They also include hydrates. Specific examples of the soluble metal ions of copper, silver or platinum are as follows. Examples of a soluble copper ion include free copper ion, tetraammine copper (II) ion, bis(ethylenediamine) copper (II) ion, ethylenediaminetetraacetic acid-copper (II) ion and tetracyanocopper (I) ion. Specific examples of a soluble silver ion include free silver ion, diammine silver (I) ion. Examples of a soluble platinum ion include free platinum ion, tetraammineplatinum (II) hydroxide and $[PtCl_4][Pt(NH_3)_4]$ (tetraammineplatinum (II) platinum tetrachloroplatinate (II)).

(Chelating Agent)

The ink preferably contains a chelating agent, particularly preferably an alkanolamine having two or more hydroxy groups. The alkanolamine having two or more hydroxy groups forms a complex with the soluble metal ion having a standard electrode potential of more than 0 V and thereby suppressing adhesion of this metal ion to the heater-side electrode. Deterioration in the ejection property can therefore be suppressed more effectively.

Examples of the alkanolamine having two or more hydroxy groups include compounds represented by the formula: $N(H)_x(R—OH)_y$, in which R represents an alkylene group, x stands for 0 or 1, y stands for 2 or 3 and x+y is 3. The alkylene group as R has preferably 1 to 5 carbon atoms, more preferably 1 to 3 carbon atoms.

Examples of the alkanolamine having two or more hydroxy groups include dialkanolamines such as diethanolamine and trialkanolamines such as triethanolamine and tripropanolamine.

The content (% by mass) of the alkanolamine having two or more hydroxy groups in the ink is preferably 0.30% by mass or more to 1.00% by mass or less based on the total mass of the ink. The content less than 0.30% may not suppress deterioration in the ejection property sufficiently because the alkanolamine content is too small from the standpoint of the balance with the soluble metal ion. The content more than 1.00% by mass may not suppress deterioration in the ejection property sufficiently because interaction between molecules tends to be enhanced, making it difficult to form a complex with the soluble metal ion.

Additional examples of the chelating agent used generally for an aqueous ink for ink jet include acid compounds such as polycarboxylic acids and phosphates. Different from the above-described alkanolamine, these compounds have an anionic group so that they tend to be attracted to the opposite electrode when voltage control is performed. As the chelating agent, therefore, the alkanolamine having two or more hydroxy groups is more preferable than the acid compound.

(Aqueous Medium)

The ink may contain water or an aqueous medium which is a mixed solvent of water and a water-soluble organic solvent. The water is preferably deionized water or ion exchanged water. The content (% by mass) of the water in the ink is preferably 50.00% by mass or more to 95.00% by mass or less based on the total mass of the ink. The content (% by mass) of the water-soluble organic solvent in the ink is preferably 3.00% by mass or more to 50.00% by mass or less based on the total mass of the ink. As the water-soluble organic solvent, any of those usable for ink jet inks such as alcohols, (poly)alkylene glycols, glycol ethers, nitrogen-containing compounds, and sulfur-containing compounds can be used.

(Other Additives)

The ink may contain, in addition to the above-described components, various additives such as anti-foaming agent, surfactant, pH regulator, viscosity modifier, rust preventive, antiseptic agent, mildew proofing agent, antioxidant and reduction preventive as needed.

(Physical Properties of Ink)

The above-described ink is an aqueous ink suited for an ink jet system. From the standpoint of reliability, proper control of its physical properties is desired. Described specifically, the surface tension at 25° C. of the ink is preferably 20 mN/m or more to 60 mN/m or less. The viscosity at 25° C. of the ink is preferably 1.0 mPa·s or more to 10.0 mPa·s or less. The pH at 25° C. of the ink is 7.0 or more to 9.5 or less, more preferably 8.0 or more to 9.5 or less.

EXAMPLES

The invention will hereinafter be described in further detail by Examples and Comparative Examples. The invention is not limited by the following Examples insofar as it does not depart from the gist of the invention. With respect to the amount of components, all designations of "part" or "parts" and "%" are on a mass basis unless otherwise particularly indicated.

<Preparation of Aqueous Solution of Resin>

(Resin 1)

A styrene-ethyl acrylate-acrylic acid copolymer (Resin 1) synthesized by a conventional method and having an acid value of 120 mgKOH/g and a weight average molecular weight of 8,000 was prepared. An aqueous solution of Resin 1 having a resin content (solid content) of 40.0% was prepared by neutralizing 40.0 parts of Resin 1 with potassium hydroxide in an amount equimolar to the acid value of the resin and adding an adequate amount of pure water.

(Resin 2)

In a manner similar to that used for the preparation of the aqueous solution of Resin 1 except that Resin 1 was replaced by a styrene-ethyl acrylate-acrylic acid copolymer (Resin 2) synthesized by a conventional method and having an acid value of 150 mgKOH/g and a weight average molecular weight of 8,000, an aqueous solution of Resin 2 having a resin content (solid content) of 40.0% was prepared.

(Resin 3)

In a manner similar to that used for the preparation of the aqueous solution of Resin 1 except that Resin 1 was replaced by a styrene-ethyl acrylate-acrylic acid copolymer (Resin 3) synthesized by a conventional method and having an acid value of 250 mgKOH/g and a weight average molecular weight of 8,000, an aqueous solution of Resin 3 having a resin content (solid content) of 40.0% was prepared.

(Resin 4)

In a manner similar to that used for the preparation of the aqueous solution of Resin 1 except that Resin 1 was replaced by a styrene-ethyl acrylate-acrylic acid copolymer (Resin 4) synthesized by a conventional method and having an acid value of 260 mgKOH/g and a weight average molecular weight of 8,000, an aqueous solution of Resin 4 having a resin content (solid content) of 40.0% was prepared.

(Resin 5)

In a manner similar to that used for the preparation of the aqueous solution of Resin 1 except that Resin 1 was replaced by a benzyl methacrylate-methacrylic acid copolymer (Resin 5) synthesized by a conventional method and having an acid value of 150 mgKOH/g and a weight average molecular weight of 8,000, an aqueous solution of Resin 5 having a resin content (solid content) of 40.0% was prepared.

(Resin 6)

A four-necked flask equipped with a thermometer, a stirrer, a nitrogen inlet tube and a condenser was charged with 240.0 parts of polytetramethylene glycol having a number average molecular weight of 1,000, 282.0 parts of isophorone diisocyanate and 0.007 part of dibutyltin dilaurate. In a nitrogen gas atmosphere, the resulting mixture was reacted at 100° C. for 5 hours and then cooled to 65° C. or less. Dimethylolpropionic acid (118.0 parts), 447.8 parts of neopentyl glycol and 150.0 parts of methyl ethyl ketone were added and the resulting mixture was reacted at 80° C. The reaction mixture was thereafter cooled to 40° C. and 20.0 parts of methanol was added to terminate the reaction. Then, an adequate amount of pure water was added and while stirring in a homomixer, a 10.0% aqueous potassium hydroxide solution was added in an amount necessary for neutralizing the resin. Under heating and vacuum, methyl ethyl ketone and an unreacted portion of the methanol were distilled off to obtain an aqueous solution of Resin 6 containing Resin 6 having an acid value of 55 mgKOH/g and a weight average molecular weight of 15,000 and a resin content (solid content) of 40.0%.

<Preparation of Aqueous Dispersion of Resin Particle>

(Resin Particle 1)

A four-necked flask equipped with a stirrer, a reflux condenser and a nitrogen gas inlet tube was charged with 18.0 parts of butyl methacrylate, 0.18 part of methacrylic acid, 2.0 parts of a polymerization initiator (2,2'-azobis(2-methylbutyronitrile)) and 2.0 parts of n-hexadecane. A nitrogen gas was introduced into the reaction system, followed by stirring for 0.5 hour. After 78.0 parts of a 6.0% aqueous solution of an emulsifier ("NIKKOL BC15", trade name; product of Nikko Chemicals) was added dropwise to the reaction system, the resulting mixture was stirred for 0.5 hour to obtain a mixture. The resulting mixture was exposed to ultrasonic waves for 3 hours by means of an ultrasonic irradiator and emulsified. In a nitrogen atmosphere, the emulsified product was subjected to a polymerization reaction at 80° C. for 4 hours. After cooling to 25° C., the resulting reaction system was filtered. An adequate amount of pure water was then added to obtain an aqueous dispersion of Resin particle 1 having a resin particle content (solid content) of 40.0%. An amount of the acid group introduced into Resin particle 1 was found to be 120 µmol/g.

(Resin Particle 2)

In a manner similar to that used for the preparation of the above-described aqueous dispersion of Resin particle 1 except that the using amount of methacrylic acid was changed to 0.35 part, an aqueous dispersion of Resin particle 2 having a resin particle content (solid content) of 40.0% was prepared. An amount of the acid group introduced into Resin particle 2 was found to be 150 µmol/g.

(Resin Particle 3)

In a manner similar to that used for the preparation of the above-described aqueous dispersion of Resin particle 1 except that the using amount of methacrylic acid was changed to 0.54 part, an aqueous dispersion of Resin particle 3 having a resin particle content (solid content) of 40.0% was prepared. An amount of the acid group introduced into Resin particle 3 was found to be 250 µmol/g.

(Resin Particle 4)

In a manner similar to that used for the preparation of the above-described aqueous dispersion of Resin particle 1 except that the using amount of methacrylic acid was changed to 0.60 part, an aqueous dispersion of Resin particle 4 having a resin particle content (solid content) of 40.0% was prepared. An amount of the acid group introduced into Resin particle 4 was found to be 270 µmol/g.

<Analysis Conditions of Resin>

The acid value of the resin and the acid group introduction amount were measured and calculated by carrying out potentiometric titration with a potassium hydroxide/ethanol titrant by means of an automatic potentiometric titrator. The weight average molecular weight (in terms of polystyrene) of the resin was measured using gel permeation chromatography. Whether the resin was water-soluble or not was analyzed by a method shown below. First, a liquid containing the resin was diluted with pure water to prepare a sample having a resin content (solid content) of 1.0%. Then, the particle size of the resin in the resulting sample was measured by dynamic light scattering. If a particle having a particle size were not measured, the resin was determined as water-soluble. The conditions employed for the measurement were as follows. As a particle size distribution analyzer, a dynamic light scattering particle size analyzer ("UPA-EX150", trade name; product of NIKKISO) was used.

[Measurement Conditions]

SetZero: 30 seconds

Measurement times: 3

Measurement time: 180 seconds

The particle size of Resin particles 1 to 4 thus synthesized could be measured by the above-described method. On the other hand, the particle size of the resins other than Resin particles 1 to 4 could not be measured, showing that they were water-soluble resins.

<Preparation of Liquid Containing a Coloring Material>

Liquids prepared as described below were each allowed to pass through a column filled with a chelate exchange resin five times to remove a polyvalent metal ion and then provided for the preparation of an ink. The content of the polyvalent metal ion in the liquid containing a coloring material which was allowed to pass through the column was measured, revealing that no soluble metal ion having a standard electrode potential of more than 0 was detected.

The content of the metal ion was measured as follows. First, in the case of a pigment dispersion liquid, after the pigment dispersion liquid was centrifuged for one hour at a rotation speed of 12,000 rpm, only the supernatant liquid was collected. The content of the metal ion in the resulting liquid was analyzed by inductively coupled plasma atomic emission spectroscopy ("ICP-OES720", trade name; product of Agilent Technologies). In the case of an aqueous dye solution, after addition of an excess of an acid to the aqueous dye solution to precipitate the dye, centrifugation was performed at a rotation speed of 12,000 rpm for one hour and only the supernatant was collected. Then a procedure similar to that used for the pigment dispersion liquid was performed to analyze the metal ion content.

(Pigment Dispersion Liquid 1 to 4 and 6 to 10)

A mixture of components (unit: %) shown in the upper columns of Table 1 was charged in a batch type vertical sand mill (product of Aimex) filled with 200 parts of zirconia beads having a diameter of 0.3 mm. The mixture was dispersed for 5 hours while cooling with water. Then, the resulting dispersion was centrifuged to remove crude particles. The residue was the pressure filtered through a cellulose acetate filter having a pore size of 3.0 μm (product of Advantec) to obtain each pigment dispersion liquid. The content of the pigment and the resin in the pigment dispersion liquid is shown in the lower column of Table 1.

(Pigment Dispersion Liquid 5)

Pigment dispersion liquid 5 having a pigment content of 10.0% was obtained by adding an adequate amount of pure water to a commercially available pigment dispersion liquid containing a self-dispersible pigment ("Cab-o-jet 300", trade name; product of Cabot Corporation). The pigment in Pigment dispersion liquid 5 is C.I. Pigment Blue 15:4.

(Aqueous Dye Solution)

After a dye (C.I. Direct Blue 199) was dissolved in pure water, an excess of an acid was added to the resulting solution to precipitate the dye. The dye thus precipitated was collected by filtration and a dye having an anionic group as an acid type was obtained as a wet cake. Pure water was added to the wet cake and then an aqueous solution of sodium hydroxide was added in an amount equimolar to the anionic group of the dye to neutralize the anionic group and dissolve the dye. An adequate amount of pure water was added further to obtain Aqueous dye solution 1 having a dye content of 10.0%.

<Preparation of an Aqueous Solution of Metal Ion>

Copper nitrate, silver nitrate, tetraammine platinum (II) hydroxide and iron nitrate were dissolved in an adequate amount of pure water to prepare aqueous solutions of metal ions having a soluble metal ion content of 100 ppm, respectively.

<Preparation of Ink>

Inks were prepared by mixing the components (unit: %) shown in the upper column of Tables 2 to 4, stirring the resulting mixture sufficiently and carrying out pressure filtration of the reaction mixture through a cellulose acetate filter having a pore size of 3.0 μm (product of Advantec). Acetylenol E100 is a nonionic surfactant produced by Kawaken Fine Chemicals. Proxel GXL (S) is an antiseptic produced by Lonza. "Polar substance" used for the preparation of Ink 53 is a polyoxyethylene (n=10) phosphate choline salt described in Japanese Patent Application Laid-Open No. 2009-051146. In the lower columns of Tables 2 to 4, shown are a content (ppm), in ink, of a soluble metal ion having a standard electrode potential of more than 0 V (specific soluble metal ion (ppm)), a content of a coloring material (coloring material (%)), a content of a water-soluble resin (water-soluble resin (%)) and a content of resin particle (resin particle (%)).

TABLE 1

Preparation conditions and properties of Pigment dispersion liquids 1 to 4 and 6 to 10

| | Pigment dispersion liquid | | | | | | | | |
|---|---|---|---|---|---|---|---|---|---|
| | 1 | 2 | 3 | 4 | 6 | 7 | 8 | 9 | 10 |
| C.I. Pigment Blue 15:3 | 10.0 | | | | 10.0 | 10.0 | 10.0 | 10.0 | 10.0 |
| Carbon black | | 10.0 | | | | | | | |
| C.I. Pigment Red 122 | | | 10.0 | | | | | | |
| C.I. Pigment Yellow 74 | | | | 10.0 | | | | | |
| Aqueous solution of Resin 1 | | | | | | | 7.5 | | |
| Aqueous solution of Resin 2 | 7.5 | 7.5 | 7.5 | 7.5 | | | | | |
| Aqueous solution of Resin 3 | | | | | | | | 7.5 | |
| Aqueous solution of Resin 4 | | | | | | | | | 7.5 |
| Aqueous solution of Resin 5 | | | | | | 7.5 | | | |
| Aqueous solution of Resin 6 | | | | | | | 7.5 | | |
| Pure water | 82.5 | 82.5 | 82.5 | 82.5 | 82.5 | 82.5 | 82.5 | 82.5 | 82.5 |
| Pigment content (%) | 10.0 | 10.0 | 10.0 | 10.0 | 10.0 | 10.0 | 10.0 | 10.0 | 10.0 |
| Resin content (%) | 3.0 | 3.0 | 3.0 | 3.0 | 3.0 | 3.0 | 3.0 | 3.0 | 3.0 |

TABLE 2

| Composition and properties of ink | Ink 1 | Ink 2 | Ink 3 | Ink 4 | Ink 5 | Ink 6 | Ink 7 | Ink 8 | Ink 9 | Ink 10 | Ink 11 | Ink 12 | Ink 13 | Ink 14 | Ink 15 | Ink 16 | Ink 17 | Ink 18 |
|---|---|---|---|---|---|---|---|---|---|---|---|---|---|---|---|---|---|---|
| Pigment dispersion liquid 1 | 30.00 | | | | | | 30.00 | 30.00 | 30.00 | 30.00 | 30.00 | 30.00 | 30.00 | 30.00 | 30.00 | 30.00 | 30.00 | 30.00 |
| Pigment dispersion liquid 2 | | 30.00 | | | | | | | | | | | | | | | | |
| Pigment dispersion liquid 3 | | | 30.00 | | | | | | | | | | | | | | | |
| Pigment dispersion liquid 4 | | | | 30.00 | | | | | | | | | | | | | | |
| Pigment dispersion liquid 5 | | | | | 30.00 | | | | | | | | | | | | | |
| Aqueous dye solution | | | | | | 30.00 | | | | | | | | | | | | |
| Pigment dispersion liquid 6 | | | | | | | | | | | | | | | | | | |
| Pigment dispersion liquid 7 | | | | | | | | | | | | | | | | | | |
| Pigment dispersion liquid 8 | | | | | | | | | | | | | | | | | | |
| Pigment dispersion liquid 9 | | | | | | | | | | | | | | | | | | |
| Pigment dispersion liquid 10 | | | | | | | | | | | | | | | | | | |
| Aqueous solution of Resin 1 | | | | | 2.50 | 2.50 | 7.50 | | | 2.50 | 22.00 | | | | | | | |
| Aqueous solution of Resin 2 | | | | | | | | | | | | | | | | | | |
| Aqueous solution of Resin 3 | | | | | | | | | | | | | | | | | | |
| Aqueous solution of Resin 4 | | | | | | | | | | | | | | | | | | |
| Aqueous solution of Resin 5 | | | | | | | | 7.50 | | 2.50 | | | | | | | | |
| Aqueous dispersion of Resin particle 1 | | | | | | | | | 7.50 | 2.50 | | 22.00 | | | | | | |
| Aqueous dispersion of Resin particle 2 | | | | | | | | | | | | | | | | | | |
| Aqueous dispersion of Resin particle 3 | | | | | | | | | | | | | | | | | | |
| Aqueous dispersion of Resin particle 4 | | | | | | | | | | | | | | | | | | |
| Aqueous solution of copper ion | 4.00 | 4.00 | 4.00 | 4.00 | 4.00 | 4.00 | 4.00 | 4.00 | 4.00 | 4.00 | 4.00 | 4.00 | 0.10 | 15.00 | | | | 1.00 |
| Aqueous solution of silver ion | | | | | | | | | | | | | | | 4.00 | | | |
| Aqueous solution of platinum ion | | | | | | | | | | | | | | | | 4.00 | | |
| Aqueous solution of iron ion | | | | | | | | | | | | | | | | | 0.90 | |
| Monoethanolamine | | | | | | | | | | | | | | | | | | |
| Diethanolamine | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| Triethanolamine | | | | | | | | | | | | | | | | | | |
| Tripropanolamine | | | | | | | | | | | | | | | | | | |
| EDTA·2Na·2H₂O | | | | | | | | | | | | | | | | | | |
| Glycerin | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Diethylene glycol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Polar substance (*) | | | | | | | | | | | | | | | | | | |
| Acetylenol E100 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| Proxel GXL(S) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion exchanged water | 54.80 | 54.80 | 54.80 | 54.80 | 52.30 | 52.30 | 47.30 | 47.30 | 47.30 | 47.30 | 32.80 | 32.80 | 58.70 | 43.80 | 54.80 | 54.80 | 57.90 | 57.80 |
| Specific metal ion (ppm) | 4.0 | 4.0 | 4.0 | 4.0 | 4.0 | 4.0 | 4.0 | 4.0 | 4.0 | 4.0 | 4.0 | 4.0 | 0.1 | 15.0 | 4.0 | 4.0 | 0.9 | 1.0 |
| Coloring material (%) | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| Water-soluble resin (%) | 0.90 | 0.90 | 0.90 | 0.90 | 1.00 | 1.00 | 3.90 | 3.90 | 0.90 | 2.90 | 9.70 | 0.90 | 0.90 | 0.90 | 0.90 | 0.90 | 0.90 | 0.90 |
| Resin particle (%) | 0.00 | 0.00 | 0.00 | 0.00 | 0.00 | 0.00 | 0.00 | 0.00 | 3.00 | 1.00 | 0.00 | 8.80 | 0.00 | 0.00 | 0.00 | 0.00 | 0.00 | 0.00 |

TABLE 3

Composition and properties of ink

| Ink | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|
| Pigment dispersion liquid 1 | 30.00 | 30.00 | | | | | | | | | | | | | | | | 30.00 |
| Pigment dispersion liquid 2 | | | 30.00 | 30.00 | | | | | | | | | | | | | | |
| Pigment dispersion liquid 3 | | | | | 30.00 | | | | | | | | | | | | | |
| Pigment dispersion liquid 4 | | | | | | 30.00 | | | | | | | | | | | | |
| Pigment dispersion liquid 5 | | | | | | | | 30.00 | 30.00 | 30.00 | 30.00 | 30.00 | 30.00 | 30.00 | 30.00 | 30.00 | | |
| Aqueous dye solution | | | | | | | 30.00 | | | | | | | | | | | |
| Pigment dispersion liquid 6 | | | 30.00 | | | | | | | | | | | | | | | |
| Pigment dispersion liquid 7 | | | | 30.00 | | | | | | | | | | | | | | |
| Pigment dispersion liquid 8 | | | | | 30.00 | | | | | | | | | | | | | |
| Pigment dispersion liquid 9 | | | | | | | | | | | | | | | | | 30.00 | |
| Pigment dispersion liquid 10 | | | | | | | | | | | | | | | | | | |
| Aqueous solution ot Resin 1 | | | | | | | | 12.50 | | | | | | | | | | |
| Aqueous solution of Resin 2 | | | | | | | | | 12.50 | | | | | | | | | |
| Aqueous solution of Resin 3 | | | | | | | | | | 12.50 | | | | | | | | |
| Aqueous solution of Resin 4 | | | | | | | | | | | 12.50 | | | | | | | |
| Aqueous solution of Resin 5 | | | | | | | | | | | | 12.50 | | | | | | |
| Aqueous solution of Resin 6 | | | | | | | | | | | | | 12.50 | | | | | |
| Aqueous dispersion of Resin particle 1 | | | | | | | | | | | | | | 12.50 | | | | |
| Aqueous dispersion of Resin particle 2 | | | | | | | | | | | | | | | 12.50 | | | |
| Aqueous dispersion of Resin particle 3 | | | | | | | | | | | | | | | | 12.50 | | |
| Aqueous dispersion of Resin particle 4 | | | | | | | | | | | | | | | | | 12.50 | |
| Aqueous solution of copper ion | 10.00 | 11.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 |
| Aqueous solution of silver ion | | | | | | | | | | | | | | | | | | |
| Aqueous solution of platinum ion | | | | | | | | | | | | | | | | | | |
| Aqueous solution of iron ion | | | | | | | | | | | | | | | | | | |
| Monoethanolamine | | | | | | | | | | | | | | | | | | |
| Diethanolamine | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| Triethanolamine | | | | | | | | | | | | | | | | | | |
| Tripropanolamine | | | | | | | | | | | | | | | | | | |
| EDTA·2Na·2H₂O | | | | | | | | | | | | | | | | | | |
| Glycerin | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Diethylene glycol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Polar substance (*) | | | | | | | | | | | | | | | | | | |
| Acetylenol E100 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| Proxel GXL(S) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion exchanged water | 48.80 | 47.80 | 54.80 | 54.80 | 54.80 | 54.80 | 54.80 | 42.30 | 42.30 | 42.30 | 42.30 | 42.30 | 42.30 | 42.30 | 42.30 | 42.30 | 42.30 | 55.30 |
| Specific metal ion (ppm) | 10.0 | 11.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Coloring material (%) | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| Water-soluble resin (%) | 0.90 | 0.90 | 0.90 | 0.90 | 0.90 | 0.90 | 0.90 | 5.00 | 5.00 | 5.00 | 5.00 | 5.00 | 5.00 | 0.00 | 0.00 | 0.00 | 0.00 | 0.90 |
| Resin particle (%) | 0.00 | 0.00 | 0.00 | 0.00 | 0.00 | 0.00 | 0.00 | 0.00 | 0.00 | 0.00 | 0.00 | 0.00 | 0.00 | 5.00 | 5.00 | 5.00 | 5.00 | 0.00 |

TABLE 4

| | Composition and properties of ink — Ink | | | | | | | | | | | | | | | | | |
|---|---|---|---|---|---|---|---|---|---|---|---|---|---|---|---|---|---|---|
| | 37 | 38 | 39 | 40 | 41 | 42 | 43 | 44 | 45 | 46 | 47 | 48 | 49 | 50 | 51 | 52 | 53 | 54 |
| Pigment dispersion liquid 1 | 30.00 | 30.00 | 30.00 | 30.00 | 30.00 | 30.00 | 30.00 | 30.00 | 30.00 | 30.00 | 30.00 | 30.00 | 30.00 | 30.00 | | | 30.00 | 30.00 |
| Pigment dispersion liquid 2 | | | | | | | | | | | | | | | | | | |
| Pigment dispersion liquid 3 | | | | | | | | | | | | | | | | | | |
| Pigment dispersion liquid 4 | | | | | | | | | | | | | | | | | | |
| Pigment dispersion liquid 5 | | | | | | | | | | | | | | | | | | |
| Aqueous dye solution | | | | | | | | | | | | | | | 30.00 | 30.00 | | |
| Pigment dispersion liquid 6 | | | | | | | | | | | | | | | | | | |
| Pigment dispersion liquid 7 | | | | | | | | | | | | | | | | | | |
| Pigment dispersion liquid 8 | | | | | | | | | | | | | | | | | | |
| Pigment dispersion liquid 9 | | | | | | | | | | | | | | | | | | |
| Pigment dispersion liquid 10 | | | | | | | | | | | | | | | | | | |
| Aqueous solution of Resin 1 | | | | | | | | | | | | | | | | | | |
| Aqueous solution of Resin 2 | | | | | | | | | | | | | | | | 2.50 | 2.50 | |
| Aqueous solution of Resin 3 | | | | | | | | | | | | | | | | | | |
| Aqueous solution of Resin 4 | | | | | | | | | | | | | | | | | | |
| Aqueous solution of Resin 5 | | | | | | | | | | | | | | | | | | |
| Aqueous solution of Resin 6 | | | | | | | | | | | | | | | | | | |
| Aqueous dispersion of Resin particle 1 | | | | | | | | | | | | | | | | | | |
| Aqueous dispersion of Resin particle 2 | | | | | | | | | | | | | | | | | | |
| Aqueous dispersion of Resin particle 3 | | | | | | | | | | | | | | | | | 25.00 | |
| Aqueous dispersion of Resin particle 4 | | | | | | | | | | | | | | | | | | 20.00 |
| Aqueous solution of copper ion | 4.00 | 4.00 | 4.00 | 4.00 | 4.00 | 4.00 | 4.00 | 4.00 | | | | | 0.09 | 16.00 | | | | |
| Aqueous solution of silver ion | | | | | | | | | | | | | | | | | | |
| Aqueous solution of platinum ion | | | | | | | | | | | 4.00 | 4.00 | | | 4.00 | 4.00 | | |
| Aqueous solution of iron ion | | | | | | | | | | | | | | | | | | |
| Monoethanolamine | 0.50 | | | | | | | | | | | | | | | | | |
| Diethanolamine | | 0.50 | | | | | | | | | | | | | | | | |
| Triethanolamine | | | 0.50 | | | | | | | | | | | | | | | |
| Tripropanolamine | | | | 0.20 | 0.30 | 1.00 | 1.10 | | 0.50 | | 0.50 | | 0.50 | | 0.50 | 0.50 | 0.20 | 0.05 |
| EDTA·2Na·2H₂O | | | | | | | | 0.60 | | | | | | | | | | |
| Glycerin | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Diethylene glycol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Polar substance (*) | 0.50 | 0.50 | 0.50 | 0.20 | 0.30 | 1.00 | 1.10 | 0.60 | 0.50 | 0.0 | 0.50 | 0.0 | 0.50 | 0.0 | 0.50 | 0.50 | 0.20 | 0.05 |
| Acetylenol E100 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| Proxel GXL(S) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion exchanged water | 54.80 | 54.80 | 54.80 | 55.10 | 55.00 | 54.30 | 54.20 | 54.70 | 58.80 | 59.30 | 54.80 | 55.30 | 58.71 | 42.80 | 52.30 | 52.30 | 34.10 | 39.25 |
| Specific metal ion (ppm) | 4.0 | 4.0 | 4.0 | 4.0 | 4.0 | 4.0 | 4.0 | 4.0 | 0.0 | 0.0 | 4.0 | 4.0 | 0.09 | 16.0 | 4.0 | 4.0 | 0.0 | 20.0 |
| Coloring material (%) | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| Water-soluble resin (%) | 0.90 | 0.90 | 0.90 | 0.90 | 0.90 | 0.90 | 0.90 | 0.90 | 0.90 | 0.90 | 0.90 | 0.90 | 0.90 | 0.90 | 1.00 | 1.00 | 0.90 | 0.90 |
| Resin particle (%) | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 10.0 | 0.00 |

<Manufacture of Recording Head>

A recording head having a constitution as shown in FIG. 2 was manufactured. The second protection layer 107 was composed of each of the following materials: iridium for Recording head 1, ruthenium for Recording head 2 and tantalum for Recording head 3. The recording head was manufactured based on the manufacturing method described in Japanese Patent Application Laid-Open No. 2008-105364.

<Evaluation>

The inks and the recording heads obtained as described above were used in the combination shown in Table 5 and following evaluation was made using an ink jet recording apparatus having the constitution as shown in FIG. 1A and FIG. 1B. In the present Examples, a solid image recorded under the condition in which eight droplets of 4 ng of an ink is applied to a unit region of 1/600 inch×1/600 inch is defined to have a recording duty of 100%. In the invention, AA, A or B is an acceptable level and C is an unacceptable level in the following evaluation criteria. Evaluation results are shown in Table 5.

The ink flow path of the recording head was filled with an ink. This allowed conduction between the heater-side region 107a of the second protection layer as a cathode and the opposite electrode-side region 107b of the second protection layer as an anode. Under such a state, as voltage control for negatively charging the heater-side region 107a of the second protection layer and positively charging the opposite electrode-side region 107b, application of a DC voltage of +2 V was started to the side of the external electrode 111 connected to the opposite electrode-side region 107b of the second protection layer (Step S2).

While retaining the voltage control state, a voltage for ink ejection was applied to the heat generating portion 104a (Step S3). Described specifically, a voltage of 20 V and a drive pulse having a pulse width of 1.5 μsec were applied $1.5 \times 10^8$ times at a frequency of 0.5 kHz to the heat generating portion 104a to eject the ink. In the ejection, the number of ejection times at which kogation adhered to the heater without performing voltage control was estimated by using an ink not containing a soluble metal ion having a standard electrode potential of more than 0 V.

Then, a 5 cm×5 cm solid image having a recording duty of 100% was recorded on a recording medium ("Canon Photo Paper Glossy", trade name; product of Canon) as "Solid image 1". Further, a cycle of applying a drive pulse to the heating unit $2.5 \times 10^7$ times under the conditions similar to the above-described ones to eject the ink and then recording a 5 cm×5 cm solid image having a recording duty of 100% was repeated to obtain Solid image 2 and Solid image 3. After completion of the recording of Solid image 3 (Step S4), the voltage control was terminated (Step S5). In Reference Examples 1 to 4, however, voltage control was not performed in any of the above-described procedures.

Unevenness of Solid images 1 to 3 thus obtained was visually checked and the ejection property were evaluated based on the following criteria.

AA: None of Solid images 1 to 3 had unevenness.

A: Solid images 1 and 2 had no unevenness but Solid image 3 had unevenness.

B: Solid image 1 had no unevenness but Solid images 2 and 3 had unevenness.

C: Any of Solid images 1 to 3 had unevenness

TABLE 5

Evaluation conditions and results

| | | Evaluation conditions | | | |
|---|---|---|---|---|---|
| | | Ink | Recording head | Voltage control | Ejection property |
| Example | 1 | 1 | 1 | present | AA |
| | 2 | 1 | 2 | present | AA |
| | 3 | 2 | 1 | present | AA |
| | 4 | 3 | 1 | present | AA |
| | 5 | 4 | 1 | present | AA |
| | 6 | 5 | 1 | present | AA |
| | 7 | 6 | 1 | present | AA |
| | 8 | 7 | 1 | present | AA |
| | 9 | 8 | 1 | present | AA |
| | 10 | 9 | 1 | present | AA |
| | 11 | 10 | 1 | present | AA |
| | 12 | 11 | 1 | present | AA |
| | 13 | 12 | 1 | present | AA |
| | 14 | 13 | 1 | present | A |
| | 15 | 14 | 1 | present | A |
| | 16 | 15 | 1 | present | AA |
| | 17 | 16 | 1 | present | B |
| | 18 | 17 | 1 | present | A |
| | 19 | 18 | 1 | present | AA |
| | 20 | 19 | 1 | present | AA |
| | 21 | 20 | 1 | present | A |
| | 22 | 21 | 1 | present | AA |
| | 23 | 22 | 1 | present | AA |
| | 24 | 23 | 1 | present | AA |
| | 25 | 24 | 1 | present | AA |
| | 26 | 25 | 1 | present | A |
| | 27 | 26 | 1 | present | AA |
| | 28 | 27 | 1 | present | AA |
| | 29 | 28 | 1 | present | AA |
| | 30 | 29 | 1 | present | A |
| | 31 | 30 | 1 | present | AA |
| | 32 | 31 | 1 | present | AA |
| | 33 | 32 | 1 | present | AA |
| | 34 | 33 | 1 | present | AA |
| | 35 | 34 | 1 | present | AA |
| | 36 | 35 | 1 | present | A |
| | 37 | 36 | 1 | present | B |
| | 38 | 37 | 1 | present | B |
| | 39 | 38 | 1 | present | AA |
| | 40 | 39 | 1 | present | AA |
| | 41 | 40 | 1 | present | A |
| | 42 | 41 | 1 | present | AA |
| | 43 | 42 | 1 | present | AA |
| | 44 | 43 | 1 | present | A |
| | 45 | 44 | 1 | present | A |
| | 46 | 1 | 3 | present | A |
| Comp. Ex. | 1 | 45 | 1 | present | C |
| | 2 | 46 | 1 | present | C |
| | 3 | 47 | 1 | present | C |
| | 4 | 48 | 1 | present | C |
| | 5 | 49 | 1 | present | C |
| | 6 | 50 | 1 | present | C |
| | 7 | 51 | 1 | present | C |
| | 8 | 52 | 1 | present | C |
| | 9 | 53 | 3 | present | C |
| | 10 | 53 | 1 | present | C |
| | 11 | 54 | 1 | present | C |
| Ref. Ex | 1 | 46 | 1 | absent | C |
| | 2 | 1 | 1 | absent | C |
| | 3 | 36 | 1 | absent | C |
| | 4 | 48 | 1 | absent | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-136748, filed Jul. 13, 2017, and Japanese Patent Application No. 2018-113664, filed Jun. 14, 2018, which are hereby incorporated by reference herein in their entirety.

What is claimed is:

1. An ink jet recording method comprising:
(A) using an ink jet recording apparatus having:
   (a) a recording head equipped with
      (i) a heater placed in an ink flow path that communicates with an ejection office,
      (ii) a first protection layer placed at a position corresponding to the heater and blocking a contact between the heater and an ink in the ink flow path, and
      (iii) a second protection layer placed at a position corresponding to the heater and to be brought into contact with the ink and made of a metal material, and
   (b) a unit for applying a voltage, with the second protection layer as a cathode and an ink-mediated conduction site as an anode; and
(B) ejecting the ink from the recording head to record an image on a recording medium,
wherein the ink comprises an aqueous ink comprising a component having an anionic group and a soluble metal ion having a standard electrode potential of more than 0 V and having a content (ppm) of the metal ion of 0.1 ppm or more to 15.0 ppm or less based on a total mass of the ink.

2. The ink jet recording method according to claim 1, wherein the metal ion comprises at least one of a copper ion and a silver ion.

3. The ink jet recording method according to claim 2, wherein a content (ppm) of at least one of the copper ion and the silver ion is 1.0 ppm or more to 10.0 ppm or less based on the total mass of the ink.

4. The ink jet recording method according to claim 1, wherein the component having the anionic group is at least one of (i) a water-soluble resin having an acid value of 250 mgKOH/g or less and (ii) a resin particle having an acid group introduction amount of 250 μmol/g or less.

5. The ink jet recording method according to claim 4, wherein the resin is at least one of an acrylic resin and a urethane resin.

6. The ink jet recording method according to claim 4, wherein a content (% by mass) of the resin in the ink is 0.10% by mass or more to 20.00% by mass or less based on the total mass of the ink.

7. The ink jet recording method according to claim 1, wherein the ink comprises an alkanolamine having two or more hydroxy groups.

8. The ink jet recording method according to claim 5, wherein a content (% by mass) of the alkanolamine having two or more hydroxy groups in the ink is 0.30% by mass or more to 1.00% by mass or less based on the total mass of the ink.

9. The ink jet recording method according to claim 1, wherein the ink comprises a compound having a copper phthalocyanine skeleton.

10. The ink jet recording method according to claim 1, wherein the second protection layer is made of at least one metal material selected from the group consisting of iridium, ruthenium and a material containing at least either one of iridium and ruthenium.

11. The ink jet recording method according to claim 1, wherein a content (% by mass) of the component having the anionic group in the ink is 0.10% by mass or more to 20.00% by mass or less based on the total mass of the ink.

12. The ink jet recording method according to claim 1, wherein the metal ion comprises a copper ion.

13. The ink jet recording method according to claim 1, wherein the component having the anionic group comprises a water-soluble resin having an acid value of 100 mgKOH/g or more to 250 mgKOH/g or less.

14. The ink jet recording method according to claim 1, wherein the component having the anionic group comprises a resin particle having an acid group introduction amount of 120 μmol/g or more to 250 μmol/g or less.

15. The ink jet recording method according to claim 1, wherein the second protection layer is made of iridium.

16. The ink jet recording method according to claim 1, wherein a voltage to be applied with the second protection layer is 0.1 V to 4 V.

17. The ink jet recording method according to claim 1, wherein a voltage to be applied with the second protection layer is 1 V to 4 V.

18. The ink jet recording method according to claim 1, wherein the ink is ejected from the recording head during an application of the voltage with the second protection layer as the cathode.

19. An ink jet recording apparatus comprising:
(a) a recording head equipped with
   (i) a heater placed in an ink flow path that communicates with an ejection orifice,
   (ii) a first protection layer placed at a position corresponding to the heater and blocking a contact between the heater and an ink in the ink flow path, and
   (iii) a second protection layer placed at a position corresponding to the heater and to be brought into contact with the ink and made of a metal material; and
(b) a unit for applying a voltage, with the second protection layer as a cathode and an ink-mediated conduction site as an anode,
wherein the ink comprises an aqueous ink comprising a component having an anionic group and a soluble metal ion having a standard electrode potential of more than 0 V and having a content (ppm) of the metal ion of 0.1 ppm or more to 15.0 ppm or less based on a total mass of the ink.

* * * * *